Patented Feb. 23, 1954

2,670,282

UNITED STATES PATENT OFFICE 2,670,282

PLANT GROWTH REGULATION

William W. Allen, Ambler, Pa., assignor to American Chemical Paint Company, Ambler, Pa., a corporation of Delaware No Drawing. Application March 5, 1952,
Serial No. 275,029

6 Claims. (Cl. 71—2.5)

This invention relates to plant growth regulating compositions. As used herein, the term "plant growth regulating composition" means any chemical composition capable of partially or totally modifying the growth of plants and thereby embraces, within its scope, root stimulation, root inhibition, defoliation, production of albinism and complete suppression or eradication of plants.

The present invention is based on the discovery that 3-amino-1,2,4-triazole when mixed with a diluent in certain amounts will regulate the growth of plants to which it is applied.

3-amino-1,2,4-triazole is a water soluble compound which melts at 153° C. after softening at 148° C. and has the following structural formula:

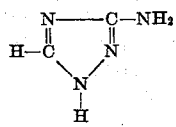

The compound may be prepared as follows. To 68 g. (0.5 mole) of aminoguanidine bicarbonate in 500 ml. round-bottomed flask is added carefully the cold dilute sulfuric acid (0.24 mole), made from 24.5 g. of concentrated acid (sp. gr. 1.84) and 50 ml. of water. After the gas evolution has subsided, the solution is heated for 1 hour on a steam bath and then evaporated to dryness under a pressure of about 15 mm.

To the white residue are added 25 g. of 98-100% formic acid and 2-3 drops of concentrated nitric acid. The mixture is heated for 24 hours on a steam bath. The resulting syrup is dissolved in 100 ml. of water and, with the temperature at 50°, is carefully treated with 25 g. of anhydrous sodium carbonate. The solution is then placed in an evaporating dish and evaporated to dryness on the steam bath. The residue is extracted twice by boiling it with 200 ml. portions of absolute ethanol, and the alcohol solutions are filtered. The alcohol is removed by evaporation and the residue triturated with 100 ml. of a mixture of equal parts of dry ethanol and dry ether and collected on a filter. The yield of crude 3-amino-1,2,4-triazole is 33-36 g. (79-86%). The melting point varies. The crude product is purified by dissolving it in 140 ml. of boiling absolute ethanol, treating it with 1 g. of Norite, and filtering. To the filtrate is added 50 ml. of ether, and the solution is placed in a refrigerator for 48 hours. The aminotriazole crystallizes and is collected by filtration. It weighs 20-25 g. (60-73% recovery) and melts at 153° after softening at 148°. (Organic Syntheses, H. Adkins, vol. 26).

Since 3-amino-1,2,4-triazole is water soluble, aqueous solutions of the compound may be used as such for application to plants. The diluent may also be solid such as chalk, talc, clay, etc. Formulations of this compound may also include, in addition to the diluent, wetting agents, penetrants, sequestrants, oils, minerals and so forth. Thus, if a formulation is to be used to promote shoot or root growth, it may be desirable to include fertilizers, trace elements, etc.

The nature of the growth regulating properties of the present compositions depends in large measure upon the concentration of 3-amino-1,2,4-triazole in the diluent or formulation. Low concentrations will exert hormonal action and thereby promote plant growth. High concentrations will act to suppress or eradicate plants.

It has been found, for example, that aqueous solutions containing 1, 10, 20 and 30 p. p. m. of 3-amino-1,2,4-triazole will stimulate the growth of seeds or seedlings. Corn seedlings (U. S. 13) where soaked in these aqueous solutions and placed in a Petri dish on moist filter paper. After five days, the primary root growth was measured and found to be 3.99, 4.92, 2.32 and 2.69 mm., respectively whereas the comparison corn seedlings grew 2.55 mm. Similar tests on cucumber seeds gave a root growth of 1.27, 0.91, 1.12 and 1.33 mm., respectively whereas the comparison seeds grew 0.49 mm.

As stated hereinabove, higher concentrations of 3-amino-1,2,4-triazole will act to suppress or eradicate plants. Thus, 50 ml. of a 200 p. p. m. solution of the compound in water was sprayed on the ground around small tomato plants. These plants rapidly lost their chlorophyll, turned white and died within two weeks.

Aqueous solutions of this aminotriazole compound were also found to suppress or eradicate weeds normally susceptible to the action of 2,4-dichlorophenoxyacetic acid. An aqueous solution containing 200 p. p. m. of the compound when applied in a ratio of two to four pounds per acre rapidly took practically all of the chlorophyll out of the weeds and suppressed their growth.

It has also been found that aqueous solutions of this aminotriazole compound will eradicate certain weeds normally considered to be quite resistant to the action of systemic herbicides. Thus a one percent aqueous solution of the compound was sprayed on Canadian thistle so that the latter was thoroughly wet. The Canadian thistle stopped growing two weeks after the spraying and was dead to ground level. No resprouting from ground level was observed as much as two months later.

It is apparent that formulations containing 3-amino-1,2,4-triazole offer promise for controlling certain difficultly-controlled obnoxious growths. In this connection it should be noted that such formulations may be used in conjunction with the common systemic herbicides such as 2,4-dichlorophenoxyacetic acid; 2,4,5-trichlorophenoxyacetic acid; 2-methyl, 4-chlorophenoxyacetic acids, their salts, esters, amides, etc. For the eradication of certain undesirable plants, a synergistic effect has been found.

As mentioned earlier, formulations of the aminotriazole compound may also include wetting agents, penetrants, sequestrants, oils and minerals. The minerals may be contributed by conventional fertilizers, the oils may include among others light motor grade and diesel oils, the sequestrants may be the hexametaphosphates, and the penetrants may include among others mahogany soaps (petroleum oil soluble sulfonates).

The wetting agents may be chosen from those commercially available such as the sulfonated vegetable oils (corn, castor, peanut, soybean, etc.), sodium lauryl sulfate, sodium cetyl sulfate, sodium sulfate of alkyl naphthalene, Tween #20 (polyoxyalkalene derivative of sorbitan monolaurate), Triton NE (a polyalkylene ether alcohol) and Carbowax (polyethylene glycols of molecular weight of 1500 or more).

In connection with the use of a wetting agent, it has been found that the addition of such an agent to a formulation containing the aminotriazole compound and a diluent materially increases the hormonal or phytotoxic activity of the aminotriazole compound to the extent that a lower concentration of the latter is required to effect the same result obtainable without the wetting agent. Thus it has been observed that aqueous solutions containing 1000 p. p. m. of the aminotriazole compound and a wetting agent have been equal in effectiveness in suppressing undesirable plant growth as aqueous solutions without wetting agents containing as much as 10,000 p. p. m. of the aminotriazole compound.

While the kind and quantity of wetting agent in the formulation may vary depending upon the kind of plant treated and the nature of the desired activity, hormonal or phytotoxic, it has been found that the amount of wetting agent used should approximate the concentration of active ingredient with maximum activity of the active ingredient as desired.

The following are illustrative, but non-limitative, examples of the compositions of the present invention.

EXAMPLE I

| | Parts |
|---|---|
| 3-amino-1,2,4-triazole | 1–30 |
| Water | 999,970–999,999 |

EXAMPLE II

| | Parts |
|---|---|
| 3-amino-1,2,4-triazole | 1–30 |
| Wetting agent | 10–100 |
| (Triton NE or Tween #20) | |
| Water | 999,960–999,899 |

EXAMPLE III

| | Parts |
|---|---|
| 3-amino-1,2,4-triazole | 1–30 |
| Talc | 999,970–999,999 |

EXAMPLE IV

| | Parts |
|---|---|
| 3-amino-1,2,4-triazole | 1 |
| Talc | 98 |
| Wetting agent | 1 |
| (Sulfonated vegetable oil) | |

Mixed in proportion of 1 pound to 200 gallons of water.

The above compositions were used to exert hormonal action or stimulate the growth of plants.

EXAMPLE V

| | Parts |
|---|---|
| 3-amino-1,2,4-triazole | 200 |
| Water | 999,800 |

EXAMPLE VI

| | Parts |
|---|---|
| 3-amino-1,2,4-triazole | 1 |
| Water | 99 |

EXAMPLE VII

| | Parts |
|---|---|
| 3-amino-1,2,4-triazole | 1 |
| Wetting agent | 1 |
| (Triton NE or Tween #20) | |
| Water | 998 |

EXAMPLE VIII

| | Parts |
|---|---|
| 3-amino-1,2,4-triazole | .2–1 |
| Wetting agent | .2–1 |
| (Triton NE or Tween #20) | |
| Water | 999.6–998 |

Examples V–VIII illustrate compositions used to exert phytotoxic effect on plants.

It will thus be seen that plant growth regulating compositions are provided by the instant invention which, in its broadest aspect, constitutes a combination of 3-amino-1,2,4-triazole with a diluent wherein the aminotriazole is present either in hormonal or phytotoxic amount. The invention further includes this basic combination and a wetting agent which materially increases the activity of the aminotriazole compound.

While several embodiments of the invention have been shown in the examples, other embodiments are easily visualized by those skilled in the art.

I claim:

1. A process of regulating the growth of plants comprising applying to a plant the compound 3-amino-1,2,4-triazole in a concentration and amount sufficient to regulate plant growth.

2. A process of killing plants comprising applying to a plant the compound 3-amino-1,2,4-triazole in a concentration and amount sufficient to kill the plant.

3. A process of defoliating plants comprising applying to a plant the compound 3-amino-1,2,4-triazole in a concentration and amount sufficient to defoliate the plant.

4. A process of stimulating root growth comprising applying to a seed the compound 3-amino-1,2,4-triazole in a concentration and amount sufficient to induce the sprouting of roots from the seed.

5. A process of inhibiting root growth comprising applying to a plant the compound 3-amino-1,2,4-triazole in a concentration and amount sufficient to inhibit root growth.

6. A process of producing albinism in plants comprising applying to a plant the compound 3-amino-1,2,4-triazole in a concentration and amount sufficient to create albinism.

WILLIAM W. ALLEN.

References Cited in the file of this patent
Chemical Abstracts—vol. 41 (1947) column 755g (abstract of article by Allen et al.).